United States Patent
Smith

(10) Patent No.: US 7,121,038 B1
(45) Date of Patent: Oct. 17, 2006

(54) LIGHTED TICKLE STICK

(76) Inventor: Kelly Smith, 499 NW. Prima Vista, Port St. Lucie, FL (US) 34983

( * ) Notice: Subject to any disclaimer, the term of this patent is extended or adjusted under 35 U.S.C. 154(b) by 0 days.

(21) Appl. No.: 11/133,032

(22) Filed: May 19, 2005

(51) Int. Cl.
*A01K 75/02* (2006.01)
(52) U.S. Cl. .................................................. 43/17.5
(58) Field of Classification Search ........... 43/17.5; 362/102, 109
See application file for complete search history.

(56) References Cited

U.S. PATENT DOCUMENTS

| | | | | |
|---|---|---|---|---|
| 4,429,350 A | * | 1/1984 | Guthrie | 362/120 |
| 5,003,437 A | * | 3/1991 | Barrett | 362/109 |
| 5,628,538 A | * | 5/1997 | Ericksen | 294/19.1 |
| 5,647,622 A | * | 7/1997 | Schectman | 294/19.1 |
| 5,720,542 A | * | 2/1998 | Birge et al. | 362/120 |
| 5,951,142 A | * | 9/1999 | Wang et al. | 362/109 |
| 5,967,638 A | * | 10/1999 | Gorman et al. | 362/84 |
| 6,145,993 A | * | 11/2000 | Filippino | 362/102 |
| 6,158,873 A | * | 12/2000 | Griffiths | 362/158 |
| 6,193,386 B1 | * | 2/2001 | Reynolds | 362/109 |
| 6,257,733 B1 | * | 7/2001 | Cruz | 362/102 |
| 6,330,888 B1 | * | 12/2001 | Aravantinos et al. | 135/66 |
| 6,726,181 B1 | * | 4/2004 | Urban et al. | 254/134.3 R |
| 2004/0212989 A1 | * | 10/2004 | Chen | 362/119 |

* cited by examiner

*Primary Examiner*—Kurt Rowan
(74) *Attorney, Agent, or Firm*—Kevin Redmond

(57) ABSTRACT

A tickle stick for locating marine life including lobsters which comprises an adjustable lighted end for probing locations where lobsters and the like may be found underwater. The stick includes a water tight compartment for housing a commercially available flash light to provide, at low cost, the light needed in locating the lobster. The water tight compartment also serves to provide positive buoyancy as well as a storage compartment.

1 Claim, 3 Drawing Sheets

LIGHTED TICKLE STICK

BACKGROUND

1. Field

The present invention relates to aids for divers and fisherman in locating fish and in particular to tickle sticks used in locating lobsters.

2. Prior Art

There have been some related prior art inventions. These inventions are described briefly in the following summaries.

U.S. Pat. No. 5,548,917 illustrates a prod or tickle stick used by a diver to urge a lobster from a hole. However, it fails to have a built-in lighting system.

U.S. Pat. No. 5,580,147 illustrates a fiber illuminated stick or probe used for assisting in the performance of incubations. However, it fails to be useful under water as a tickle stick U.S. Pat. No. 5,947,579 illustrates a lighting device used by underwater divers. However, it is not useful as a tickle stick.

U.S. Pat. No. 5,967,638 illustrates an illuminated diving aid for use in areas or conditions of zero or low visibility. However, it fails to be useful as a tickle stick.

U.S. Pat. No. 6,158,873 illustrates an underwater light where the light source is located in the head assembly. However, it is not useful as a tickle stick, nor is it used for catching lobsters.

In addition to the short comings of prior art devices noted above, most tickle sticks require special custom lights built into the stick. There is no adjustment of the angle of the end of the stick or the light for different situations and the stick is difficult to locate if dropped underwater. These and other short comings of prior art devices are overcome by the present invention which is described below.

SUMMARY

It is an object of the present invention to provide a tickle stick which includes a water tight compartment that can house a commercially available flashlight, making the tickle stick more economical as well as more useful in locating lobsters.

It is an object of the present invention to provide a tickle stick which includes an adjustable end that can quickly and easily be set to a desired angle with respect to the body of the tickle stick.

It is an object of the present invention to provide a tickle stick which includes a control circuit that causes the tickle stick light to flash on and off if the stick has not moved for a predetermined time.

The present invention is a tickle stick for locating lobsters and other marine life which includes an articulated, lighted end for probing locations where lobsters maybe found underwater. The stick includes a water tight compartment for housing a commercially available flashlight to provide, at low cost, the light needed to locate lobsters or the like.

The water tight compartment also houses a motion detector, a timer, a flasher circuit and a power control circuit which interrupts the light causing it to flash if the stick has not moved for more than a predetermined period of time. With this circuitry, even if the stick has been dropped underwater, it may be easily located by its flashing light.

The water tight compartment is made sufficiently large so that the overall tickle stick including the compartment may have a positive buoyancy, causing the stick to float to the surface if released underwater. No separate floation device is required.

DETAILED DESCRIPTION OF THE INVENTION

In locating lobsters underwater, a tickle stick is used to probe locations where lobsters or other marine life tend to hide such as crevices in rocks. This probing can cause a lobster or the like to leave such locations and reveal itself. A light on the tickle stick helps in locating and then following the lobster as he leaves his hiding place. One of the problems occurring in using a tickle stick of this type is the lobsters may hide up under a rock which cannot be reached by a straight tickle stick or even with one with a fixed bend at its end. A second problem is the initial high cost and expensive repair of the special lights usually built into tickle sticks. Both of these problems as well as other problems with prior art tickle sticks are overcome by the present invention.

Figure 1:
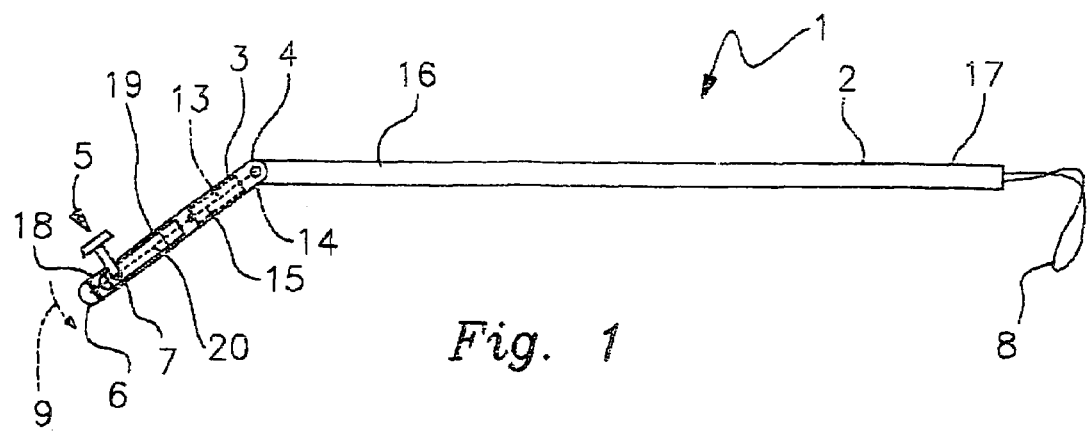
FIG. 1 is a side view of a tickle stick showing the body, an articulated arm or end which is attached to the body by a rotary joint, a reflector-shield, and a removable lens which covers an opening to a water tight compartment for holding a flash light that is attached to the articulated end.

FIG. 1 is a side view of a tickle stick 1 of the present invention showing a body or shaft 2, an articulated end 3 attached to the body by a rotary joint 4, a reflector-shield 5, a removable lens 6 which covers an opening to a water tight compartment 7 which is attached to the articulated end of the tickle stick. The reflector shield is rotatably connected to the compartment by connectors passing through holes 25 and 26 located in the reflectors arms 23 and 24 respectively. The reflector and can rotate through the path indicated by the dashed line 6 to direct the light from the compartment to a desired location or protect the compartment lens from damage.

At the opposite end of the tickle stick from the adjustable end is a laniard 8. The operator normally slips his hands through the loop of the laniard and grips the laniard 8. If the operator loses his grip, the laniard tends to hold the stick to the wrist of the operator, preventing loss.

There are three other ways in which the loss of the tickle stick underwater is prevented. The first is by painting the body 2 in bright colors so that the tickle stick is easily identified when lying on the bottom. The second is providing for extra air space in the light compartment to give the tickle stick a positive buoyancy, causing it to float to the surface if let loose underwater. The third is causing the light to flash when the stick is let go and lies motionless for a predetermined period.

Figure 2:
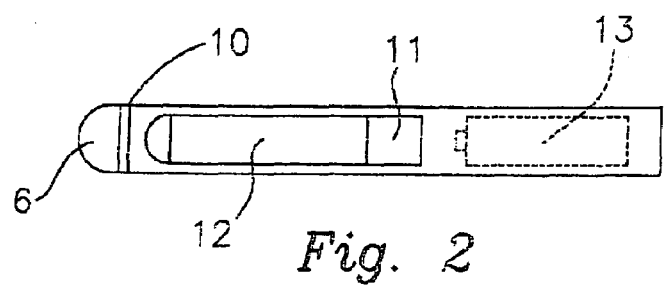
FIG. 2 is a broken away side view of the water tight compartment showing the location of an O-ring, the reflector-shield, control circuit, and a storage compartment.

FIG. 2 is a cross sectional side view of the water tight compartment 7 showing the location of an O-ring 10 located between the lens 6 and the compartment 7. Typically the lens is threaded onto the end of the compartment and compresses the O-ring. The O-ring is only one illustrative means of making the water tight compartment secure. Other suitable watertight closures may be used such as clamps to hold the lens to the compartment. Also shown in this Figure is an extra battery 13 and a flasher control unit 11 used to house circuitry to control a flash light 12.

Additional air space, such as where battery 13 is located in FIG. 2 in the water tight compartment is used to provide the tickle stick with positive buoyancy, causing it to float to the surface where the flashing light will be exposed to facilitate locating the stick. Alternatively, this space may be used to carry extra batteries, such as battery 13 causing the stick to remain at the bottom if dropped. This latter option may be chosen for clear water conditions where a dropped stick may be easily located by the flashing light.

The articulated end 3 has a first end 13 to the left, a second end 14 to the right and a central axis running from the first end 13 to the second end 14. The compartment also has a first end 18 to the left, a second end 19 to the right and a central axis 20 running from the first end 18 to the second end 19. The central axes 15 and 20 typically are parallel and this relative positioning may be achieved by attaching the air tight compartment at the first end of the articulated arm as shown or by attaching the compartment along side the articulated end. Other means of attachment providing this relationship are also possible and will be obvious to those skilled in the art.

Figure 7:
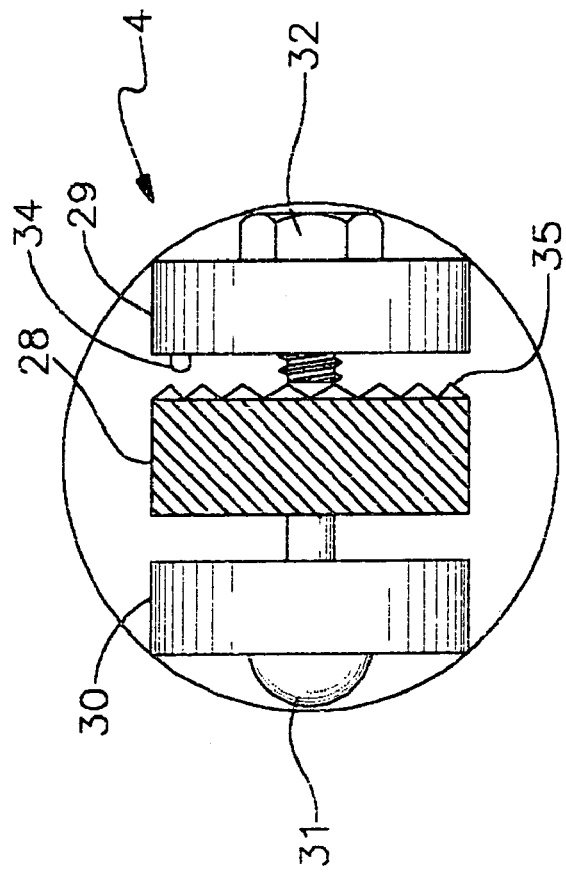
FIG. 7 is a rear view of two adjacent segments of the joint between the articulated arm and the shaft of the tickle stick showing a detent arrangement for holding the tickle stick arm at an angle with respect to the shaft.

The flash light is placed in the compartment with its light emitting end pointing directly towards the lens so that light from the flash light will pass through the lens outside the compartment generally along the central axis of the compartment. Since the central axes of the compartment and the articulated end are parallel, the light will generally be directed in the direction of the articulated end. This direction can be adjusted by merely adjusting the direction of the articulated end at the rotary joint. The articulated end may be rotated about the rotary joint 4 and be selectively locked into various position by detents in this joint which are shown in FIG. 7 and described below.

At this right end of the articulated end is a hole 21 used to form a part of the joint 4. This rotary joint connects the adjustable end to the tickle stick shaft. At left end of the articulated end 3 is the lens 6. This lens maybe unscrewed to provide access to the water tight compartment 7. Separating the lens 6 from the compartment 7 is the O-ring 10 used to seal the water tight compartment 7. The lens 6 is threaded into the adjustable end, compressing the O-ring 18. The lens may be removed by unscrewing it and a lens with a different magnification may be substituted. When operating in murky water, the brightness and concentration of the light is important and a more narrowly focused lens is necessary in order to make it possible to see under such conditions. Where the water is clearer, a lens having a low magnification may be used to provide a light with a broader beam. Once the flashlight has been installed, the lens and O-ring may be replaced.

In the present invention, a commercial flashlight may be used as opposed to special lights required for prior art devices. Although the flashlight is not waterproof, the compartment in which it is placed is waterproof, preventing any damages to the flashlight and also allowing the use of a lower cost device than those that are is commonly used in tickle sticks. The water tight compartment is made large enough to hold sufficient air to give the tickle stick buoyancy to prevent loss if the stick is dropped. This dual use of the compartment eliminates the need for special buoyancy devices.

The reflector-shield 5 is connected near the left end of the compartment 7, allowing the reflector-shield to be rotated out in front of the lens. This reflector-shield prevents the lens from being damaged by hitting rocks and the reflective action of the reflector-shield permits directing the light in a different direction from that of the central axis of the compartment. The ability to direct the light by the reflector is useful in locating lobsters in unusually shaped holes. The reflector 9 can be adjusted to provide the direction and strength of light needed to find the lobsters in such a situation.

To the right within the water tight compartment 7 is a flash control unit 11 which is used to cause the light to flash on after the tickle stick has been dropped and lays at rest for a predetermined period of say 2 minutes, for example. After this period has expired, the light slowly flashes, giving the operator an added means of finding the tickle stick when it has been lost under water. Additional space in the water tight compartment maybe used for flotation or can be used to carry spare batteries or weights causing the tickle stick not to float. This is a good choice in clear water where the stick can be easily seen under water. In clouded water, the spare battery or weight maybe removed causing the stick to float to the surface where it may more easily be found.

The flasher circuitry may be connected to a customized flashlight in which leads are brought from the flash light battery and connected to an on/off switch controlled by the flasher control circuitry. Alternatively, an adapter may be provided which mates with the control unit at the interface between the flashlight. In FIG. 2, the control unit including the flasher that is designated by drawing numeral 11.

Figure 6:
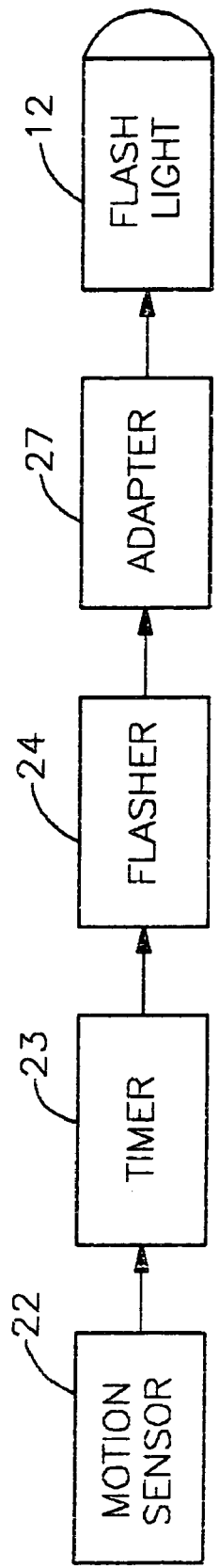
FIG. 6 is a block diagram of the flash control module contained in the water tight compartment.

FIG. 6 shows a block diagram of the flasher control unit. It can be seen that the flasher control unit comprises a motion sensor 22, a timer 23, and a flasher 24. In the operating of this control system, the motion sensor sends no signal to the timer when no motion is detected. If the timer receives no signal from the motion detector for a predetermined period, it produces a output which causes the flasher to turn the flash light on and off, producing a periodic flashing light.

The above described circuitry is only illustrative. The end result, which is a flashing light after a predetermined period of no motion may be achieved by a number of means known to those skilled in the art.

A standard flash light may be modified to permit control by the control unit by placing an adapter switch 27 in series with the battery in the flash light. The adapter opens and closes in accordance with the flasher unit in the control circuitry.

Figure 3:
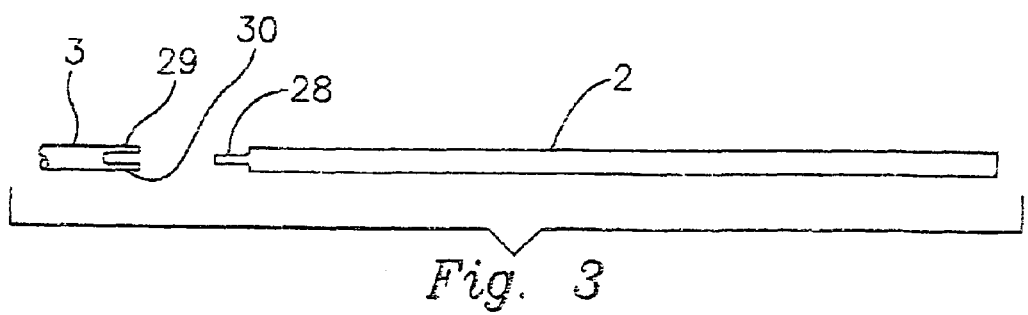
FIG. 3 is a plan view of a first end of the tickle stick shaft with the articulated end moved a short distance away to show details of the rotary joint between the tickle stick shaft and the articulated end.

FIG. 3 is a plan view of the left end of the tickle stick with the articulated end 3 detached. The articulated end 3 is forked and has two prongs 29 and 30. The shaft 2 has a single prong 28 which fits between prongs 29 and 30 to form the rotary joint. It should be noted that the present invention can function with or without an adjustable end as long as the end is set at an angle with respect to the main portion of the tickle stick.

Figure 4:
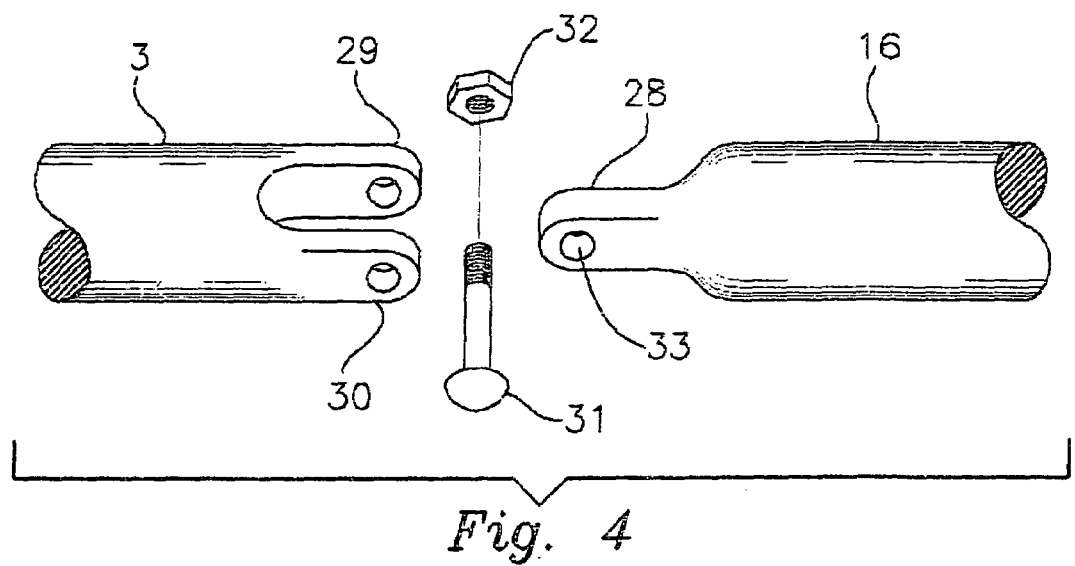
FIG. 4 is a perspective view of the portion of the rotary joint shown in FIG. 3 showing a bolt about which the joint rotates.

FIG. 4 is a prospective view of the portion of the joint 4 shown in FIG. 3 and also includes a bolt 31 about which joint rotates. The bolt is passed through holes in the projections such as hole 33 in projection 28. The bolt head may include knurling or wings so that it may be tightened by hand. Alternatives other than a bolt are possible. Many pin-like device may be substituted for the bolt. These devices may be held in position by projections or other means such as cotter pins.

FIG. 7 shows an end view of the rotary joint 4. The spacing between prongs 29 and 30 is shown expanded so that the details of the detent means can be shown. The prong 29 contains a spring loaded ball 34. The prong 28 contains a series of depression such as depression 35 facing and having the shape to match and accept ball 34. The spring loaded ball 34 is urged into a depression to temporarily lock the articulated end at a chosen angle with respect to the tickle sticks shaft. The ball may be forced out of one depression and into another by merely rotating the articulated end to a desired position with respect to the shaft. The above description is only illustrative. Other detent means may be easily substituted by those skilled in the art.

Figure 5:
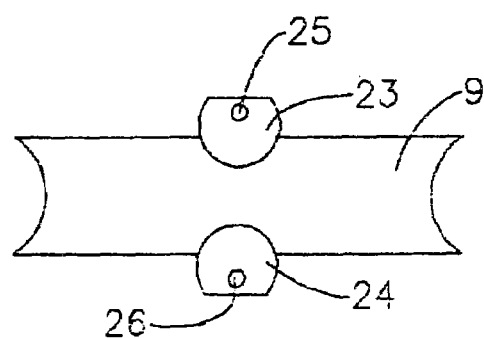
FIG. 5 is a plan view of the reflector-shield.

FIG. 5 is a plan view of the reflector-shield assembly comprising the reflector-shield 9, and arms 23 and 24 for connecting the shield to the compartment. Each arm containing a hole such as hole 25 and 26 for rotatably attaching the arms to the compartment. As the reflector-shield is moved out in front of the lens, light impinges on the inside surface of the shield, focusing and directing it at an angle determined by the position of the reflector-shield with respect central axis of the compartment. Since the reflector-shield may be positioned in front of the lens, it also serves as a shield to prevent the lens from being damaged by probing operations in rocky areas.

I claim:

1. A tickle stick for locating marine life underwater, comprising
   (a) a shaft having a first and a second end and a central axis running through the center of the shaft between said first and second ends and,
   (b) an articulated arm having a first and second end, and a central axis running between said first and said second end, said arm being attached to said first end of said shaft by way of a rotatable joint, said joint includes:
   a first hole in said first end of said shaft,
   a second hole in said second end of said articulated arm, and
   a pin extending through said first and second holes, whereby said articulated arm may rotate with respect to said shaft about said pin, said articulated arm includes detent means for moving said articulated arm through a series of holding positions with respect to said shaft,
   (c) a water tight compartment, said compartment being attached to said articulated arm, said compartment including a first and second end and a central axis running between said first and second end, said central axis running generally parallel to the central axis of said articulated arm with the first end of said compartment being positioned away from the first end of said shaft and said compartment including a removable lens at its first end to provide access to said compartment and to permit light to pass through said lens from said compartment to outside said compartment said compartment contains a volume sufficient to provide said tickle stick with a positive buoyancy, causing said tickle stick to float when released under water, said compartment accepting weights to make said tickle stick to have a negative buoyancy causing said tickle stick to remain underwater when released,
   (d) a flashlight having a light emitting end, said flashlight and light emitting end positioned in said compartment to direct the light from said flashlight out of said compartment through said lens, and
   (e) a motion sensor, a timer, a flasher and means for connecting said motion sensor to said timer and to said flash light to cause said flash light to flash on and off after a predetermined time of no motion determined by said timer and motion sensor to indicate the position of a tickle stick with negative buoyancy after release underwater.

* * * * *